United States Patent [19]

Warnock et al.

[11] 4,155,085

[45] May 15, 1979

[54] NAVIGATIONAL AID

[75] Inventors: Francis E. Warnock, Marblehead; Lloyd M. Pearson, Quincy; John C. Herther, Lexington, all of Mass.

[73] Assignee: Iotron Corporation, Bedford, Mass.

[21] Appl. No.: 919,865

[22] Filed: Jun. 28, 1978

[51] Int. Cl.² .............................. G01S 9/02; H04N 7/00
[52] U.S. Cl. ........................... 343/5 EM; 343/112 PT; 358/103
[58] Field of Search .................... 343/5 EM, 112 PT; 364/456, 460, 461, 521; 358/103, 104

[56] References Cited

U.S. PATENT DOCUMENTS

| 3,188,631 | 6/1965 | Birtley | 343/5 EM |
| 3,725,918 | 4/1973 | Fleischer et al. | 343/5 EM |
| 3,971,018 | 7/1976 | Isbister et al. | 343/5 EM |
| 4,128,834 | 12/1978 | Katagi | 343/5 EM |

Primary Examiner—S. C. Buczinski

[57] ABSTRACT

For use with a ship's radar having a plan position indicator display, a navigational aid providing a selected output signal for the radar for displaying two selected pairs of a plurality of stored pairs of parallel left and right selected navigational guide lines of different direction and of different ranges-from-ship. It includes a manual direction input switch for inputting a direction for each of the plurality of pairs of guide lines, a manual range-from-ship input switch for inputting a range-from-ship for each of the guide lines, storage for each of the input directions and their associated ranges-from-ship of the pairs of parallel left and right guide lines, a manual selection switch for selecting the output signal for the two selected pairs, and a digital display for displaying the direction and ranges-from-ship of one of the selected pair.

6 Claims, 7 Drawing Figures

NAVIGATIONAL AID

This invention relates to ship navigation. More particularly, it relates to a navigational aid for use with the ship's radar.

When a ship is within radar range of land, the land echo presentation will move across the radar plan position indicator display in a direction opposite to the ship's course. This is also true of the radar echo displays of all fixed navigation aids, such as towers, lighthouses and buoys. Using the previously established planned course, the navigator can determine the range at which identifiable land radar echoes should pass abeam if the ship's intended course is maintained. This radar derived information is usually plotted for comparison with the established course, in order to insure that the ship remains clear of areas of danger.

Normal ship navigation practice when entering confined waters, such as a harbor, is to establish in advance successive course lines on the charts for these waters. The ship's position is then continously determined by using radar and/or visual fixes and these positions are constantly plotted and compared with the established planned course. The allowable deviation in position from the planned course will depend on the established channel, required water depth and areas of danger close to which the ship must pass. At best, navigation of a large ship is difficult in confined waters, particularly when frequent course changes are needed and requires the constant attention of the ship's navigator. To a considerable extent, this diverts attention from the movement of other ships which might present a collision hazard.

Also, whenever it is necessary to change course in confined waters, such as making turns in a channel, it is necessary to begin turning the ship before the actual turning point is reached if the ship is to finish the turn on the proper course. This has always been a problem, particularly with large ships.

Accordingly, it is a major object of the invention to provide a novel navigational aid, for use with the ship's radar, which will make easier and safer navigation within confined waters where many course changes may be required within a short time.

It is another object of the invention to simplify navigation by the advance storing of navigational information for subsequent use. This is particularly important in confined waters where frequent course changes are required, in order to relieve the ship's navigator from the necessity of constantly plotting the ship's position.

It is another object of the invention to provide a navigational aid which makes it easier to make accurate turns in confined waters.

In order to accomplish these objects, the invention provides a plurality of preset navigational guide lines for both simultaneous and successive display on the ship's radar display together with the usual radar derived information. In general, this is accomplished by providing means to establish and store a plurality of sets or pairs of such lines, at least more than two in number, and to successively select either one or two sets or pairs for display as needed.

More specifically according to the invention, a navigational aid is provided for use with a ship's radar system having a plan position indicator display and controller for the display, the controller having line-display capability. The navigational aid of the present invention has manual direction input switch means for inputting a plurality of navigational guide line directions, and manual range-from-ship input switch means for inputting a plurality of navigational guide line ranges, each associated with one of the plurality of directions. The navigational aid further has storage means connected to the input switch means for storing the input directions with their associated ranges.

Manual selection switch means are provided for selecting a particular stored navigational guide line direction and associated range. Output signal means are connected to the storage means and to the controller, the output signal means being responsive to the selection switch means for outputting signals representative of the selected particular direction and associated range to the display controller for display as a navigational guide line on the display.

In preferred embodiments, a single direction is associated with a pair of ranges for display as a pair of navigational guide lines having parallel directions but independently assignable ranges. Digital display means are connected to the output signal means and are responsive to the selection switch means to display in digital form the direction and ranges of the particular selected pair of lines. A second output signal means is connected to the storage means and to the controller, and is responsive to a second selection switch means to output signals representative of a second selected direction and associated ranges to the controller for display as a second pair of navigational guide lines.

Other objects, features and advantages will appear from the following description of a preferred embodiment of the invention, together with the drawings, in which.

Figure 1:
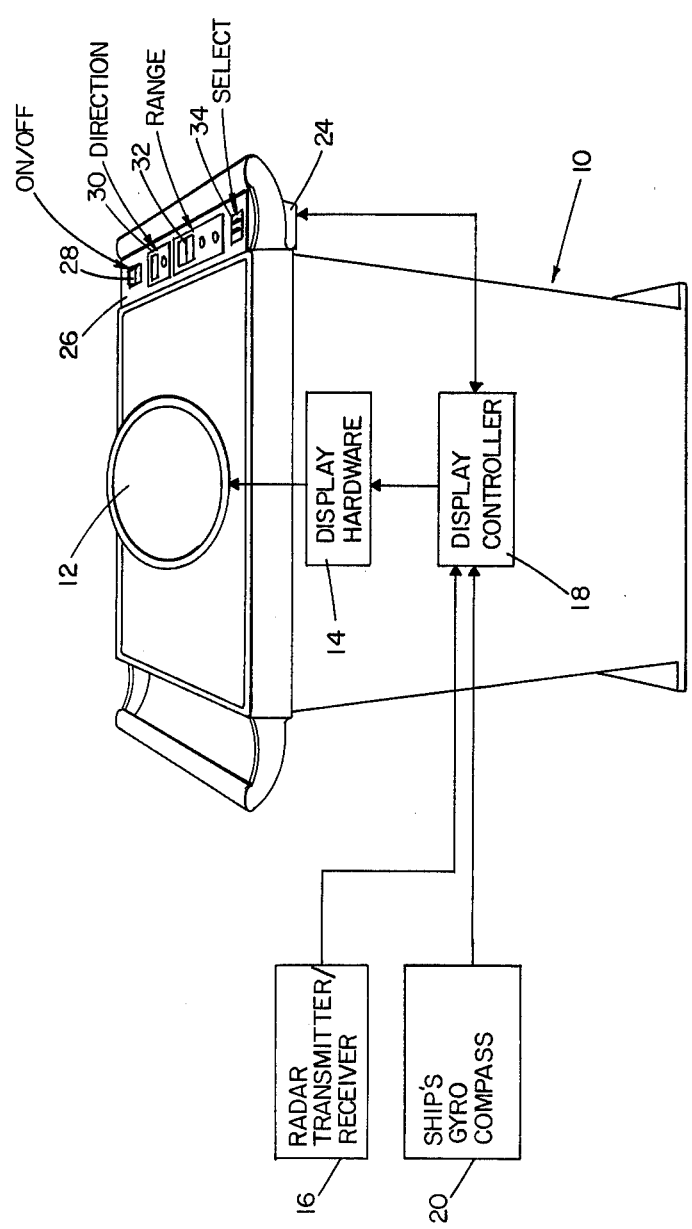
FIG. 1 is a schematic showing of the housing of the navigational aid of the invention connected to a suitable radar display console.

Referring now to the drawings, and in particular to FIG. 1, a console 10 provides a conventional radar plan position indicator display 12, comprising a conventional cathode ray tube, and display hardware 14. Signals from a conventional ship's radar transmitter/receiver 16 are input to display controller 18, together with a signal from the ship's gyro compass 20. Signals from controller 18 are input to display hardware 14 for display on display 12.

Display controller 18, which forms no part of the present invention, may be of any known type having the capability of processing the radar echoes received from receiver 16 and deriving and selecting therefrom desired features for display. Other parameters input to controller 18 might include, for example, a choice of range scale for the display, and a head-up or north-up orientation of the display, selected by means of controls on console 10, not shown here. Further, the controller 18 must have the capability of generating a line display in response to the input of appropriate signals.

The navigational aid of the invention is housed in housing 24, which is attached to one side of console 10, but may be in any other convenient location, depending on the design of the radar display console or other design factors. Signals from the navigational aid are input to display controller 18 for processing together with the received radar signals to control display 12.

The signals from the navigational aid are graphically displayed on the radar display in the form of navigational guide lines fixed with respect to the ship's position. Generally a parallel pair of such lines is displayed. The direction of each pair of guide lines may be moved through 360 degrees and the range of each guide line from the indication of own ship's position may be independently varied, by means of the controls on housing 24. A second pair of guide lines may also be displayed. The selection of particular pairs of guide lines from a set of pairs whose directions and ranges have been previously stored is also accomplished through the controls on housing 24, as will be explained.

Housing 24 provides a control panel 26, which includes an on/off switch 28, a direction panel 30, a range panel 32, and a select panel 34.

Figure 2:
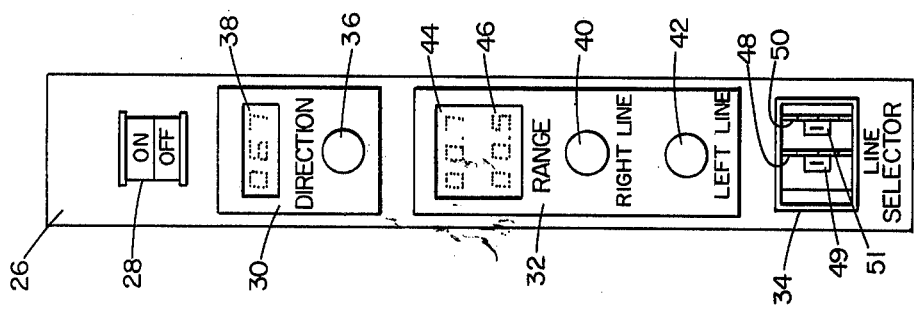
FIG. 2 shows the control panel of the navigational aid of the invention.

Referring now to FIG. 2, direction panel 30 of control panel 26 includes a direction input control switch 36 and a 000 to 359 degree direction display 38. Range panel 32 includes a Right Line range control switch 40 and a Left Line range control switch 42, with two three-digit range displays 44 and 46. The digital displays 38, 44 and 46 may be of any known type, either mechanical or electrical, such as light-emitting diodes. Means to control such displays to display particular digits are well known and therefore have not been disclosed in detail.

Select panel 34 provides two thumbwheel selector switches 48 and 50 with indicators 49 and 51.

Left thumbwheel switch 48 selects for display on the radar and digitally indicates a specific pair of the stored navigation guide lines, identified by a digit from "0" to "9". Right thumbwheel switch 50 selects and indicates a second specific pair of navigation guide lines. The functions of these line selector switches will be explained in what follows.

Figure 3:
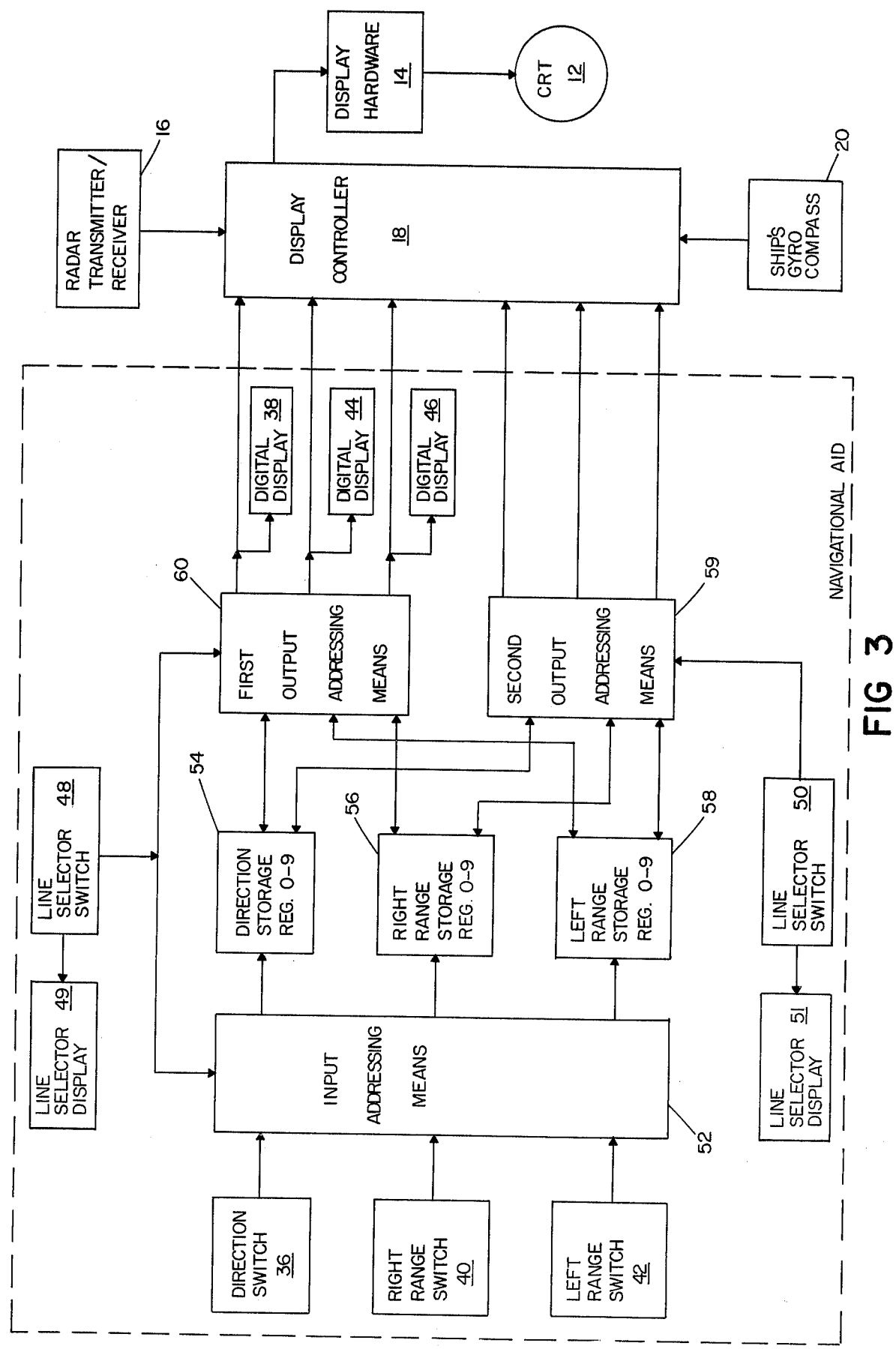
FIG. 3 is a schematic showing of the navigational aid of the invention in more detail.

Referring now to FIG. 3, the inputs from direction input control switch 36, Right Line range control switch 40 and Left Line range control switch 42 are input to input addressing means 52, which is connected to direction storage block 54, right range storage block 56, and left range storage block 58. Each storage block 54, 56 and 58 contains ten registers, identified by the digits "0" through "9". Line selector switch 48 controls input addressing means 52 to direct the input signals from switches 36, 40 and 42 to the registers indicated by the digit shown on indicator 49.

Storage blocks 54, 56 and 58 are connected to first output addressing means 60. Line selector switch 48 controls first output addressing means 60 to output the contents of the registers indicated by the digit shown on indicator 49 to the appropriate digital displays 38, 44 and 46 on control panel 26 (FIG. 2). At the same time, these contents are output to display controller 18 of the radar display console 10.

Storage blocks 54, 56 and 58 are also connected to second output addressing means 59. Line selector switch 50 controls second output addressing means 59 to output the contents of the registers indicated by the digit shown on indicator 51 to display controller 18 of the radar display console 10.

The stored and displayed direction of the pair of lines whose identifying digit is indicated by thumbwheel switch 48 may be altered by actuation of switch 36 on control panel 26. The new value of the direction is input to input addressing means 52, which is controlled by line selector switch 48 to input the new value into the selected register of direction storage block 54. At the same time, line selector switch 48 controls first output addressing means 60 to output the new value to digital direction display 38 and to the display controller 18.

Similarly, actuation of Right Line control switch 40 alters the stored and displayed range of the right line of the pair of lines selected by line selector switch 48. The range of the left line of the displayed pair is correspondingly controlled by actuation of Left Line control switch 42. The ranges of both lines are digitally displayed on the digital readouts 44 and 46 and are input, together with the direction, to controller 18, which controls the graphical display of the selected pair of guide lines on the display 12.

Line selector switch 50 selects a second pair of guide lines, by controlling second output addressing means 59 to output the contents of the registers indicated by indicator 51 to display controller 18 for graphical display on display 12. If both thumbwheel selector switches 48 and 50 indicate the same pair of lines, only a single pair appears on display 12. If different pairs of lines are selected, two pairs appear on display 12. However, the direction and range of the first pair only, as selected by switch 48, can be altered through the actuation of control switches 36, 40, and 42. If it is desired to alter the stored parameters of the second pair of lines, it must be selected by the selector switch 48.

Figure 4:
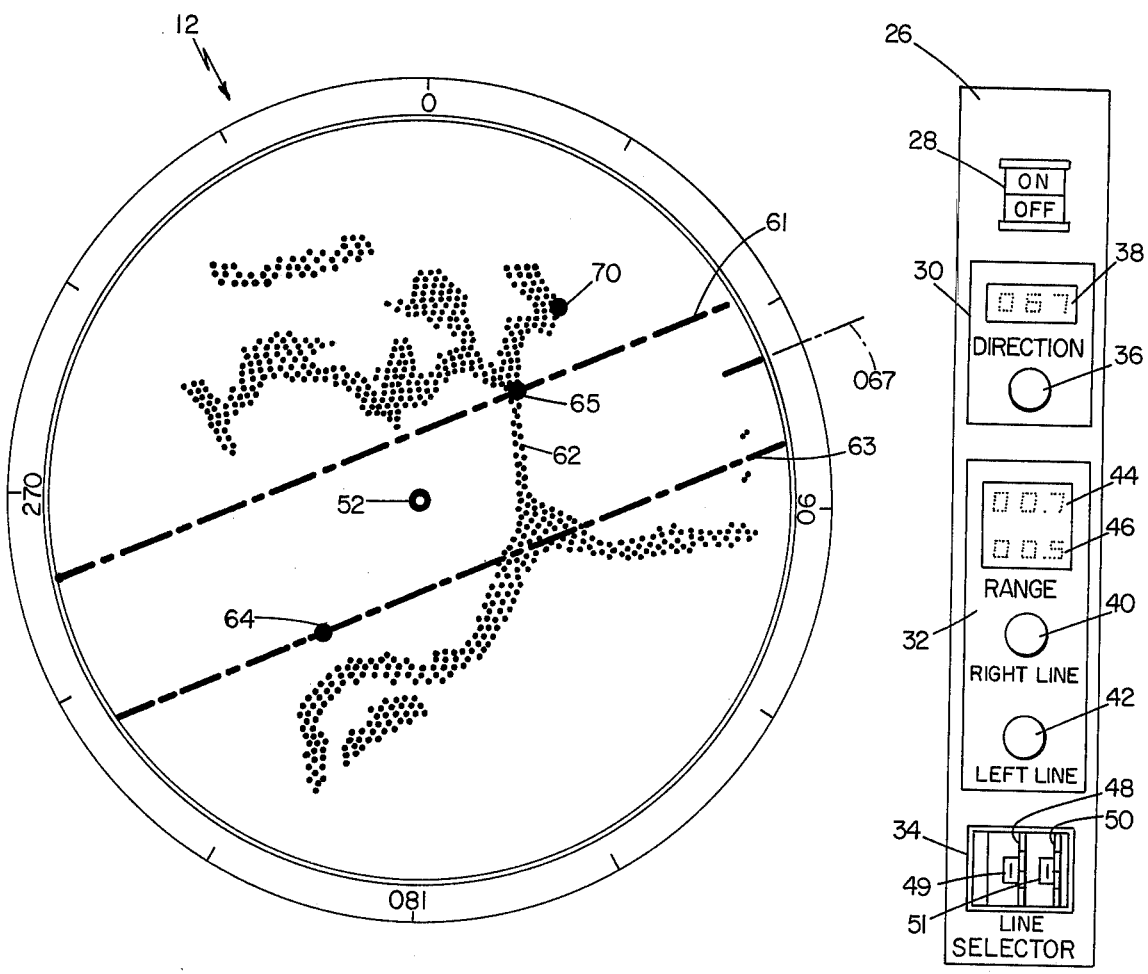
FIGS. 4, 5 and 6 show the radar display and digital displays corresponding to particular selected inputs to the navigational aid of the invention.
Figure 5:
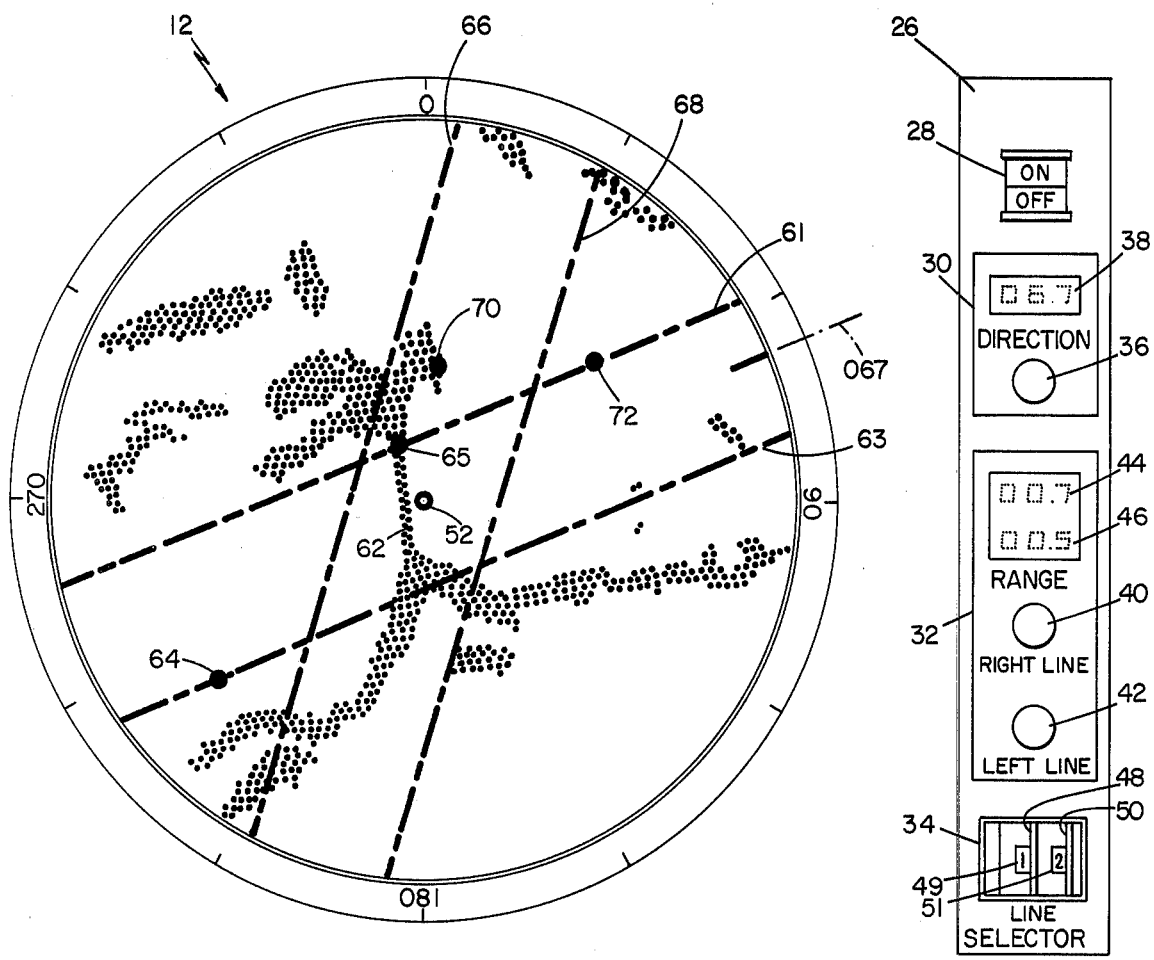
Figure 6:
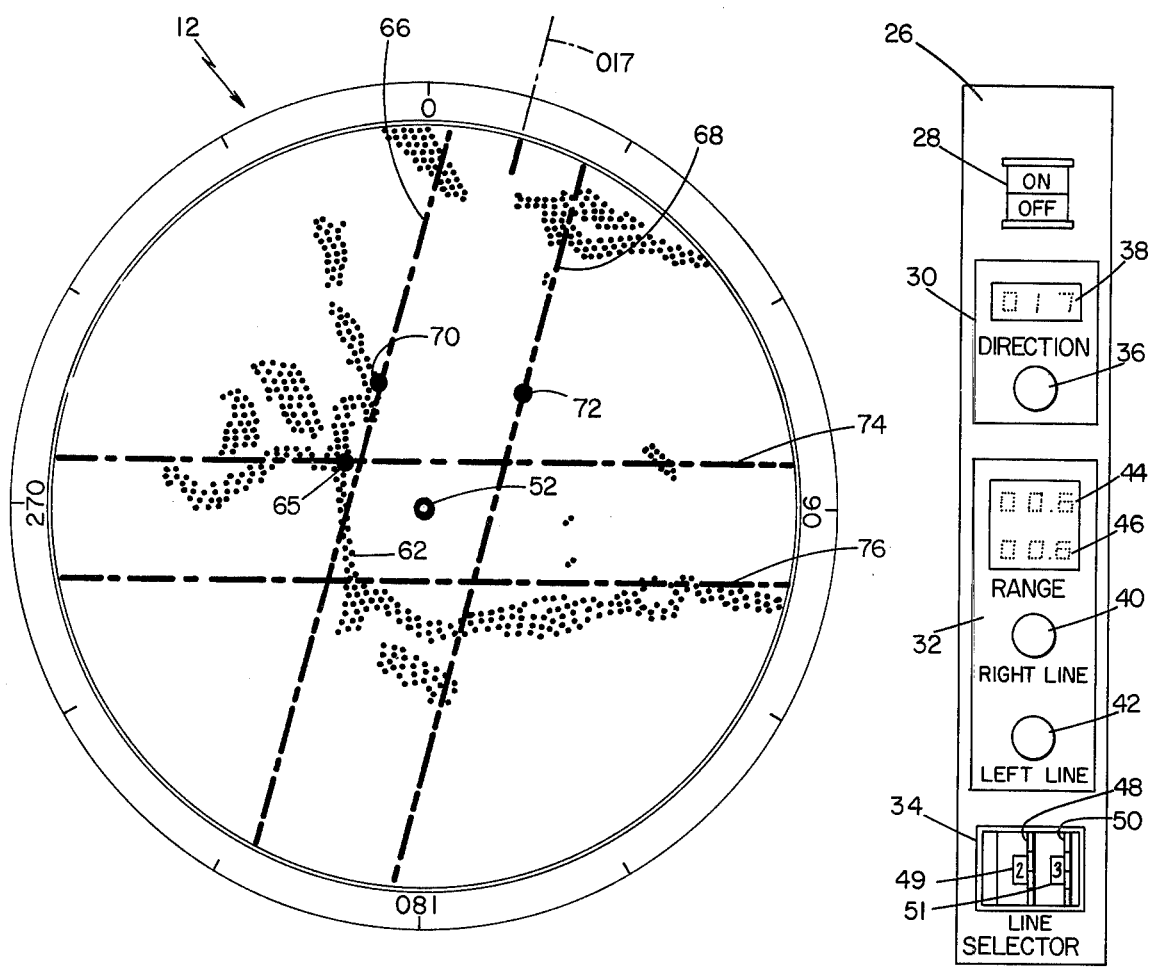

Referring now to FIGS. 4, 5 and 6, the display 12 of radar console 10 is shown together with the navigational aid control panel 26, during the use of the navigational aid of the invention in successive stages in entering San Francisco Bay.

Figure 7:
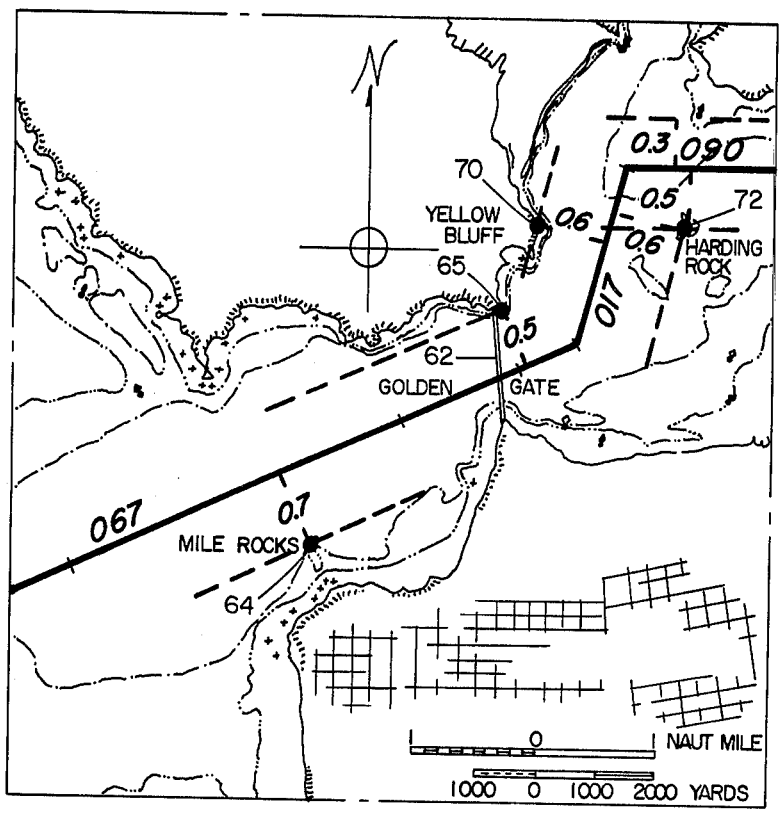
FIG. 7 is a portion of a navigational chart corresponding to the displays of FIGS. 4, 5 and 6.

In preparation for such entry, a chart of the Bay, a portion of which is shown in FIG. 7, has previously been marked to indicate six successive planned courses, together with their distances abeam of prominent marks for establishing guide line ranges. Using this information, six corresponding sets of guide lines have previously been set by means of the navigational aid of the invention. However, only the initial three of the courses and two of their pairs of guide lines are shown in the Figures.

Referring first to FIG. 7, a portion of the chart for San Francisco Bay is reproduced. The initial three successive intended courses have been indicated as 067, 017 and 090 degrees and their distances from the selected marks measured and noted on the chart. Prior to entering the Bay, these directions and their associated ranges, plus the remaining succeeding directions and ranges, have all been stored as guide line pairs "1" through "6". The ability of the navigational aid of the invention to so store such navigational information before entering confined waters is extremely important, since it relieves the navigator from the constant plotting of such details and leaves him free to pay proper attention to unexpected matters such as other ships which might be a collision hazard.

FIG. 4 shows the corresponding radar display as the ship approaches the Golden Gate Bridge on a course of 067 degrees. The ship's position in the center of the display is indicated at 52. The display is shown gyrostabilized north-up. The Golden Gate Bridge is indicated by reference numeral 62, and the irregular outline of landmass is visible. This portion of the display is derived by controller 18 from the radar echoes received by radar receiver 16, in the usual manner.

In FIG. 4, thumbwheel selector switches 48 and 50 are both turned to select the "1" pair of stored guide lines. Consequently, only one pair of navigation guide lines is displayed on radar display 12. The direction (067 degrees) of the pair of guide lines is shown in digital direction display 38. The range (0.7 mile) of the right guide line 63 is shown in digital display 44, and the range (0.5 mile) of the left guide line 61 is shown in digital display 46. The right line 63 of the pair had been pre-set to coincide with the Mile Rocks lighthouse 64 as a boundary. The left line 61 had been positioned to pass through the north tower 65 of the Golden Gate Bridge to provide a guide for passing under the Golden Gate Bridge 62.

As the ship moves, the land echo display will appear to move across the radar display 12 in a direction opposite to the ship's course of 067 degrees. The ship's position remains fixed at the center of display 12 and the guide lines 61 and 63 remain fixed with respect to the ship.

In the view of FIG. 5, the ship has passed under Golden Gate Bridge and is approaching the turning point to the next course of 017 degrees. Thumbwheel selector switch 50 has been turned to select the "2" pair of stored guide lines 66 and 68, which are then displayed on the display 12 together with the "1" pair. These guide lines were previously set for a course of 017 degrees, with the left line 66 at a range of 0.6 miles to pass through Yellow Bluff lighthouse 70 and the right line 68 also at a range of 0.6 miles to pass through Harding Rock buoy 72. The digital displays of panel 26 still display data pertaining to the "1" pair of stored guide lines. As the ship continues on its course of 067 degrees, the apparent movement of the "2" guide lines as they approach lighthouse 70 and buoy 72 makes it possible for the navigator to accurately judge the position of the intersection of the 067 degree and succeeding 017 degree courses. This enables him to begin to turn the ship to the left in anticipation of the ship's arrival at that position so that at the completion of the turn, the ship will be accurately positioned on the course of 017 degrees. The ship will be so positioned when the left guide line 66 of the "2" pair passes through lighthouse 70 and the right guide line 68 passes through buoy 72.

In FIG. 6, the ship is established on the next planned course of 017 degrees, with the left guide line 66 passing through lighthouse 70 and the right guide line 68 passing through buoy 72. Thumbwheel switch 48 indicates the "2" pair of lines and the digital displays now display data pertaining to this pair of guide lines. Since it is no longer necessary to view the previous set of guide lines, thumbwheel switch 50 is turned to "3" to display the next successive stored set of guide lines for the next course of 090 degrees, with the left guide line 74 set at 0.3 miles and the right guide line 76 at 0.5 miles to indicate the next turning point when it passes through buoy 72. As it approaches buoy 72, the ship is turned to the right onto its new course of 090 degrees as described above.

Succeeding course changes are similarly displayed as needed from the remaining pre-stored settings "4" through "6".

For some planned courses, only one navigation guide line may be required, as when navigating along a shoreline with outlying areas of danger. Under such circumstances, in order to eliminate either the right or left guide line, the operator simply sets the range of that line to a value greater than the greatest distance shown on the display. The remaining line, which may be aligned with an identified fixed point, is then displayed alone.

What is claimed is:

1. For use with a ship's radar system having a plan position indicator display and controller for said display, said controller having line-display capability, a navigational aid providing manual direction input switch means for inputting a plurality of navigational guide line directions, manual range-from-ship input switch means for inputting a plurality of navigational guide line ranges, each associated with one of said plurality of directions, storage means connected to said input switch means for storing said input directions with said associated ranges, manual selection switch means for selecting a particular stored navigational guide line direction and associated range, and output signal means connected to said storage means and to said controller, said output signal means being responsive to said selection switch means for outputting signals representative of said selected particular direction and associated range to said display controller for display as a navigational guide line on said display.

2. The navigational aid of claim 1, further including digital display means connected to said storage means and responsive to said selection switch means for displaying said selected particular direction and associated range.

3. The navigational aid of claim 1, said range-from-ship input switch means including a left range input switch and a right range input switch, whereby a single said navigational guide line direction is associated with two said ranges, for display as a pair of parallel navigational guide lines of different ranges.

4. The navigational aid of claim 3, further including digital display means connected to said storage means and responsive to said selection switch means for displaying said selected particular direction and associated ranges.

5. The navigational aid of claim 4, further including a second output signal means connected to said storage means and to said controller, and second selection switch means, said second output signal means being responsive to said second selection switch means for outputting signals representative of a second selected particular direction and associated ranges to said display controller for display as a second pair of navigational guide lines on said display.

6. For use with a ship's radar having a plan position indicator display navigational aid means providing a selected output signal for said radar for displaying two selected pairs of a plurality of greater than two stored pairs of parallel left and right selected navigational guide lines of different direction and of different ranges-from-ship, comprising manual direction input switch means for inputting a direction for each of said plurality of pairs of guide lines manual range-from-ship input switch means for inputting a range-from-ship for each of said guide lines storage means for storing each of said input directions and its associated ranges-from-ship of said plurality of greater than two pairs of parallel left and right guide lines manual selection switch means for selecting said output signal for said two selected pairs, and digital display means for digitally displaying the direction and ranges-from-ship of one of said selected pairs.

* * * * *